United States Patent
Mann et al.

(10) Patent No.: US 6,185,732 B1
(45) Date of Patent: Feb. 6, 2001

(54) SOFTWARE DEBUG PORT FOR A MICROPROCESSOR

(75) Inventors: Daniel P. Mann, Austin, TX (US); Carl K. Wakeland, Scotts Valley, CA (US)

(73) Assignee: Advanced Micro Devices, Inc., Sunnyvale, CA (US)

( * ) Notice: Under 35 U.S.C. 154(b), the term of this patent shall be extended for 0 days.

(21) Appl. No.: 08/923,597

(22) Filed: Aug. 25, 1997

Related U.S. Application Data (60) Provisional application No. 60/043,070, filed on Apr. 8, 1997.

(51) Int. Cl.$^7$ .............................. G06F 9/45; G06F 11/34; G06F 11/28
(52) U.S. Cl. .................................. 717/4; 714/34; 714/38; 712/227
(58) Field of Search ................ 395/704, 500.44–500.49; 714/25, 27, 30, 31, 32, 33, 34, 35, 38, 39, 40, 45, 47, 44, 36; 712/227, 35; 717/4

(56) References Cited

U.S. PATENT DOCUMENTS

| | | | |
|---|---|---|---|
| 5,058,114 | | 10/1991 | Kuboki et al. ........................ 714/45 |
| 5,491,713 | * | 2/1996 | Samsundaram et al. ....... 395/183.21 |
| 5,544,311 | * | 8/1996 | Harenberg et al. .................... 714/40 |
| 5,560,036 | * | 9/1996 | Yoshida ................................ 712/227 |
| 5,724,505 | * | 3/1998 | Argade et al. ......................... 714/45 |
| 5,812,562 | * | 9/1998 | Baeg .................................... 714/726 |
| 5,838,692 | * | 11/1998 | Tobin .................................... 714/724 |
| 5,838,897 | * | 11/1998 | Bluhm et al. .......................... 714/30 |
| 5,861,371 | * | 1/1999 | Wilsch-Irrgang et al. ........... 510/504 |
| 5,862,367 | * | 1/1999 | Chiao-Yen ............................ 710/71 |
| 5,903,718 | * | 5/1999 | Marik .................................... 714/38 |

FOREIGN PATENT DOCUMENTS

| | | |
|---|---|---|
| 0316609 A2 | 5/1989 | (EP) . |
| 0316609 A3 | 5/1989 | (EP) . |
| 0636976 A1 | 2/1995 | (EP) . |
| 0762279 A1 | 3/1997 | (EP) . |
| 0849670 A1 | 6/1998 | (EP) . |
| 59-194245 | 11/1984 | (JP) . |

OTHER PUBLICATIONS

Pentium Processor's User Manual, vol. 3: Architecture and Programming Manual, by Inel Corporation, pp. 17–1 through 17–9, 1994.
*Embedded System Engineering Show Catalogue*, by Motorola, pp. 52–54, Apr./May 1997.
*MEVB Quick Start Guide*, by Motorola, pp. 3–5 and 7–2 (admitted prior to Aug. 25, 1997).
*Choosing a Cross–Debugging Methodology*, Embedded Systems Programming, Aug. 1997.
CPU 32 Reference Manual, by Motorola, pp. 7–1 through 7–13 (admitted prior to Aug. 25, 1997).

(List continued on next page.)

*Primary Examiner*—Kakali Chaki
(74) *Attorney, Agent, or Firm*—Akin, Gump, Strauss, Hauer & Feld, LLP (57) ABSTRACT

A processor-based device incorporating a software debug port that utilizes a JTAG or similar standardized interface, thereby providing a software debug communication mechanism that does not require a special bond-out package. In one embodiment of the invention, only standard JTAG pins are used for communications between a host platform and a target system incorporating a target processor. In another embodiment of the invention, the software debug port of the target processor is augmented for higher-speed access via optional sideband signals. When used in conjunction with an on-chip trace cache, the software debug port provides trace information for reconstructing instruction execution flow on the processor and is also capable of examining register contents without halting processor operation. The software debug port alleviates many of the packaging and clock synchronization problems confronting existing debug solutions.

29 Claims, 4 Drawing Sheets

OTHER PUBLICATIONS

K5 HDT, e-mail describing K5 HDT, Jan. 11, 1997.
*Advanced On-chip Debug for ColdFire Developers*, Embedded Systems Programming, Apr./May 1997, pp. 52 through 54.
IBM Corporation, "Tailorable Embedded Event Trace", Dec. 1991, pp. 259–261, IBM Technical Disclosure Bulletin, vol. 34, No. 7B, XP000282573.
Geoff Revill, "Advanced On-chip Debug for ColdFire Developers", Embedded System Engineering, Apr./May 1997, pp. 52–54.

* cited by examiner

SOFTWARE DEBUG PORT FOR A MICROPROCESSOR

RELATED APPLICATION

This application claims priority to U.S. application Ser. No. 60/043,070, filed Apr. 8, 1997, which is hereby incorporated by reference.

BACKGROUND OF THE INVENTION

1. Field of the Invention

The invention relates to software debug support in microprocessors, and more particularly to a microprocessor incorporating a software debug port.

2. Description of the Related Art

It is clear that the growth in software complexity and increasing processor clock speeds have placed an increasing burden on application software developers. The cost of developing and debugging new software products has become a significant factor in processor selection. A processor's failure to adequately facilitate software debug results in longer customer development times and reduces the processor's attractiveness for use within industry. The need to provide software debug support is particularly acute within the embedded products industry, where specialized on-chip circuitry is often combined with a processor core.

In addition to the software engineer, other parties are also affected by debug tool configuration. These parties include: the "trace" algorithm developer who must search through captured trace data that reflects instruction execution flow in a processor; the in-circuit emulator developer who deals with problems of signal synchronization, clock frequency and trace bandwidth; and the processor manufacturer who does not want a solution that results in increased processor cost or design and development complexity.

With desktop systems, complex multitasking operating systems are currently available to support debugging. However, the initial task of getting these operating systems running reliably often requires special development equipment. While not the standard in the desktop environment, the use of such equipment is often the approach taken within the embedded industry. Logic analyzers, read-only memory (ROM) emulators and in-circuit emulators (ICE) are frequently employed. In-circuit emulators do provide certain advantages over other debug environments, offering complete control and visibility over memory and register contents, as well as overlay and trace memory in case system memory is insufficient. Use of traditional in-circuit emulators, which involves interfacing a custom emulator back-end with a processor socket to allow communication between emulation equipment and the target system, is becoming increasingly difficult and expensive in today's age of exotic packages and shrinking product life cycles.

Assuming full-function in-circuit emulation is required, there are a few known processor manufacturing techniques able to offer the required support for emulation equipment. Most processors intended for personal computer (PC) systems utilize a multiplexed approach in which existing pins are multiplexed for use in software debug. This approach is not particularly desirable in the embedded industry, where it is more difficult to overload pin functionality.

Other more advanced processors multiplex debug pins in time. In such processors, the address bus is used to report software trace information during a BTA-cycle (Branch Target Address). The BTA-cycle, however, must be stolen from the regular bus operation. In debug environments where branch activity is high and cache hit rates are low, it becomes impossible to hide the BTA-cycles. The resulting conflict over access to the address bus necessitates processor "throttle back" to prevent loss of trace information. In the communications industry, for example, software typically makes extensive use of branching and suffers poor cache utilization, often resulting in 20% throttle back or more. This amount of throttling is unacceptable amount for embedded products which must accommodate real-time constrains.

In another approach, a second "trace" or "slave" processor is combined with the main processor, with the two processors operating in-step. Only the main processor is required to fetch instructions. The second, slave processor is used to monitor the fetched instructions on the data bus and keeps its internal state in synchronization with the main processor. The address bus of the slave processor functions to provide trace information. After power-up, via a JTAG (Joint Test Action Group) input, the second processor is switched into a slave mode of operation. Free from the need to fetch instructions, its address bus and other pins provide the necessary trace information.

Another existing approach involves building debug support into every processor, but only bonding-out the necessary signal pins in a limited number of packages. These "specially" packaged versions of the processor are used during debug and replaced with the smaller package for final production. This bond-out approach suffers from the need to support additional bond pad sites in all fabricated devices. This can be a burden in small packages and pad limited designs, particularly if a substantial number of "extra" pins are required by the debug support variant. Additionally, the debug capability of the specially packaged processors is unavailable in typical processor-based production systems.

In yet another approach (the "Background Debug Mode" by Motorola, Inc.) limited on-chip debug circuitry is provided for basic run control. Through a dedicated serial link requiring additional pins, this approach allows a debugger to start and stop the target system and apply basic code breakpoints by inserting special instructions in system memory. Once halted, special commands are used to inspect memory variables and register contents. This serial link, however, does not provide trace support—additional dedicated pins and expensive external capture hardware are required to provide trace data.

Thus, the current solutions for software debugging suffer from a variety of limitations, such as increased packaging and development costs, circuit complexity, processor throttling, bandwidth matching difficulties, and non-standardized interfaces that must be redesigned for each new generation of processor. Further, there is currently no adequate low-cost procedure for providing trace information. The limitations of the existing solutions are likely to be exacerbated in the future as internal processor clock frequencies continue to increase.

SUMMARY OF THE INVENTION

Briefly, a processor-based device according to the present invention provides a flexible, high-performance solution for embedded hardware/software debug. Controllability and observability are achieved through a software debug port that uses an IEEE-1149.1-1990 compliant JTAG (Joint Test Action Group) interface or a similar standardized interface that is integrated into a processor or processor-based device. The software debug port provides a serial debug communication mechanism that does not require a special bond-out package. When used in conjunction with an on-chip trace cache, the software debug port is capable of providing trace information for reconstructing instruction execution flow on the processor and is also capable of examining register contents without halting processor operation.

Most computers are equipped with a serial or parallel interface which can inexpensively be connected to the software debug port of a "target" system by means of a serial connector to control the debug process. Higher speed network-to-JTAG conversion equipment is also available, enabling Unix-based workstations to be easily connected to the target system. Because a system according to the invention provides a standard debug interface, in-circuit emulation equipment designed to interface with the physical connector can be reused without the need to develop expensive back-end equipment to conform with variations and advances in processor packaging.

In one embodiment according to the invention, only standard JTAG pins are used for communications between a host platform and a target system incorporating the target processor. In another embodiment according to the invention, the software debug port of the target processor is augmented for higher-speed access via optional sideband signals. These optional sideband signals can also be used with a bond-out parallel interface that provides even greater functionality. A custom command set provides effective controllability and observability for the debug solution. These commands operate in conjunction with a plurality of internal debug registers to pass trace, status and control information to and from on-chip debug and trace logic. When used with an on-chip trace cache, no external capture hardware is required in order to receive trace information.

Thus, a processor or processor-based product according to the invention incorporates a software debug port providing a low cost, low intrusion communication channel between a target system and a host platform. The software debug port alleviates many of the packaging and clock synchronization problems that limit existing debug solutions.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
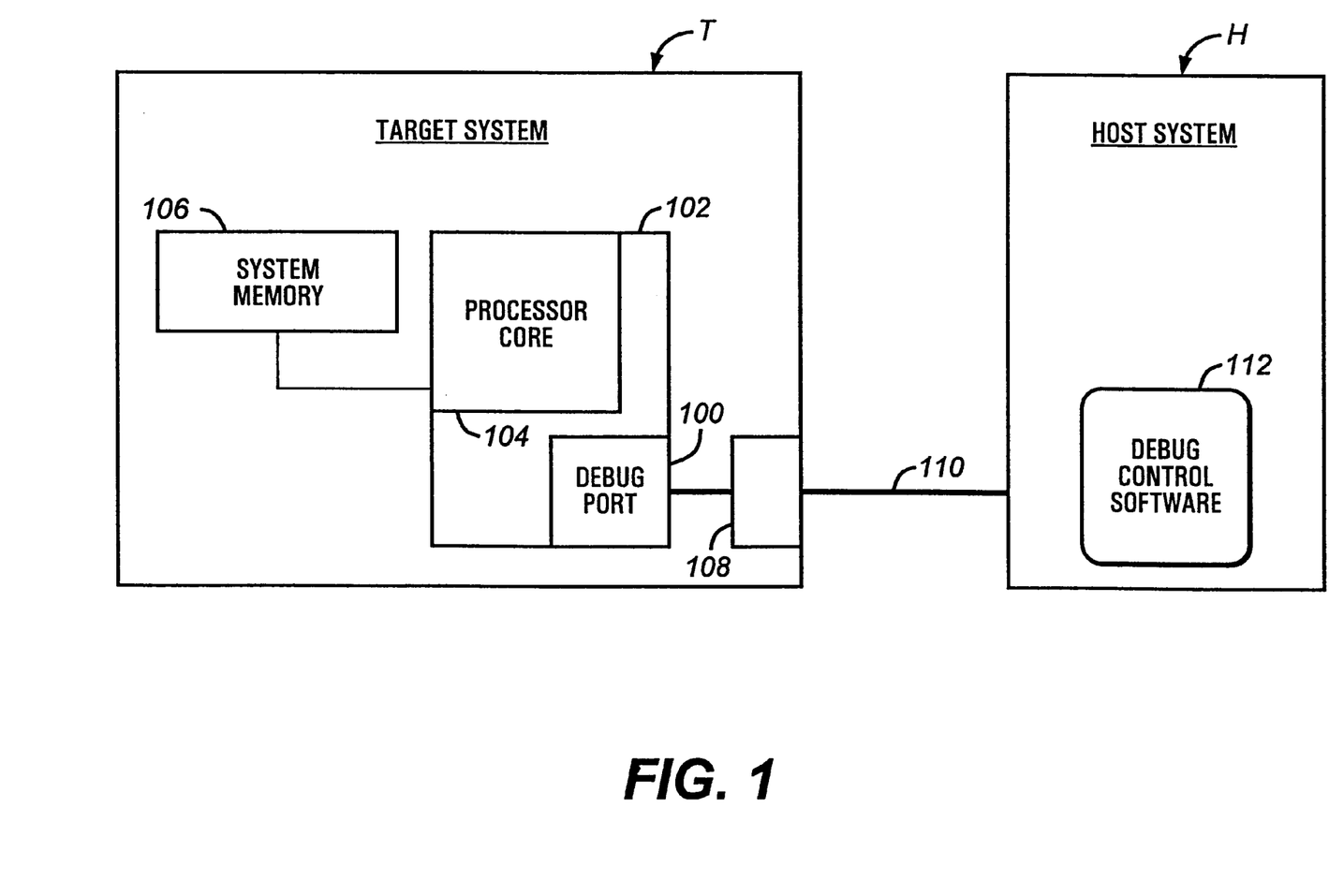
FIG. 1 is a block diagram of a software debug environment utilizing a software debug port according to the present invention.

Turning now to the drawings, FIG. 1 depicts a software debug environment utilizing a debug port 100 according to the present invention. A target system T is shown containing an embedded processor device 102 coupled to system memory 106. The embedded processor device 102 incorporates a processor core 104 and the debug port 100. Although not considered critical to the invention, the embedded processor device 102 may incorporate additional circuitry (not shown) for performing application specific functions, or may take the form of a stand-alone processor or digital signal processor. Preferably, the debug port 100 uses an IEEE-1149.1-1990 compliant JTAG interface or other similar standardized serial port interface.

A host system H is used to execute debug control software 112 for transferring high-level commands and controlling the extraction and analysis of debug information generated by the target system T. The host system H and target system T of the disclosed embodiment of the invention communicate via a serial link 110. Most computers are equipped with a serial or parallel interface which can be inexpensively connected to the debug port 100 by means of a serial connector 108, allowing most computers to function as a host system H. Exemplary serial connectors 108 are described below in conjunction with FIGS. 3A and 3B. Alternatively, the serial connector 108 could be replaced with higher speed JTAG-to-network conversion equipment.

Figure 2:
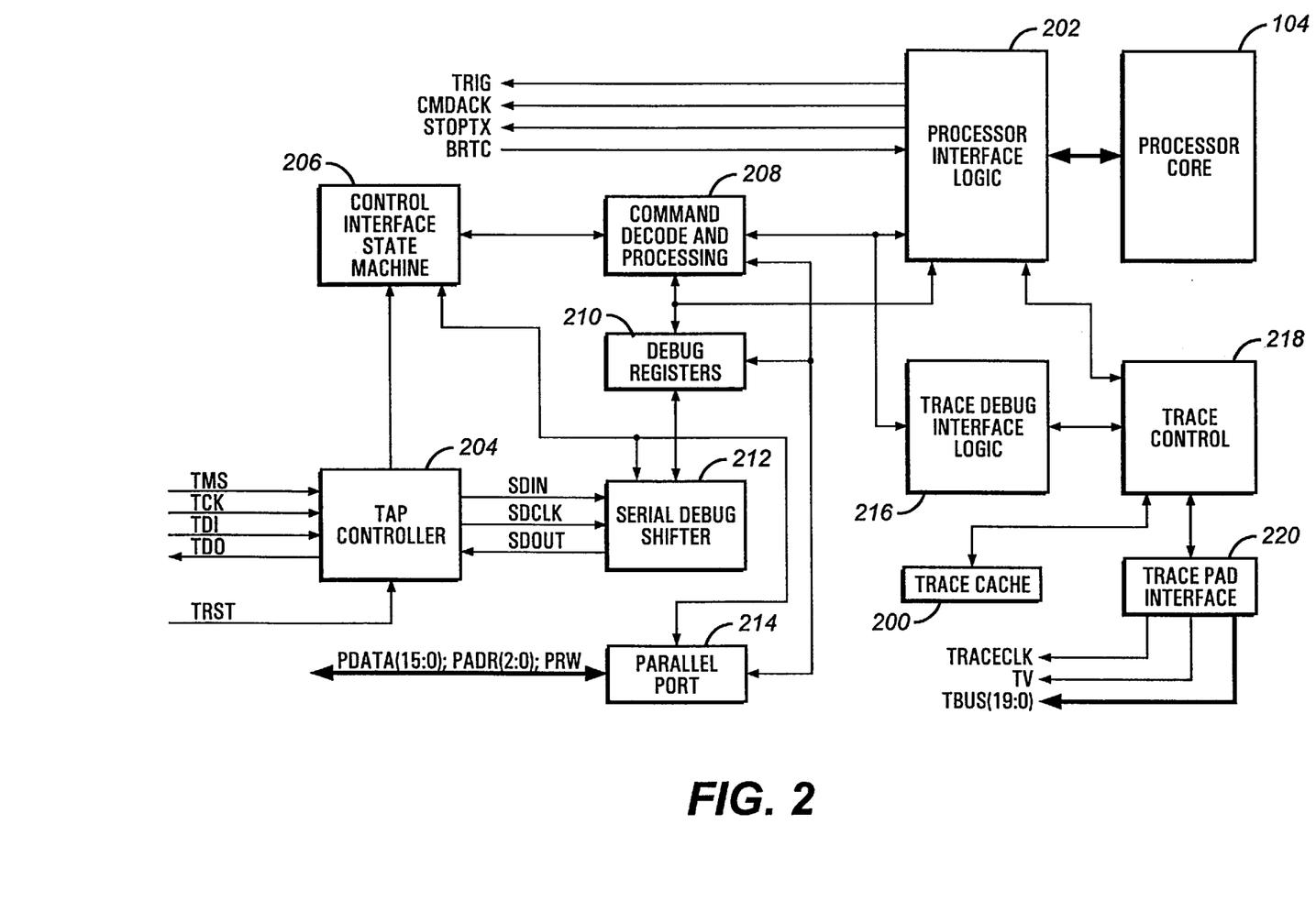
FIG. 2 is a block diagram providing details of an exemplary embedded processor product incorporating a software debug port according to the present invention.

Referring now to FIG. 2, details of the embedded processor device 102 are provided. In addition to the processor core 104, FIG. 2 depicts the various elements of an enhanced embodiment of the debug port 100. At a minimum, only the conventional JTAG pins need be supported in the software debug port 100 according to the invention. The JTAG pins essentially become a transportation mechanism, using existing pins, to enter commands to be performed by the processor core 104. Assuming that the embedded processor device 102 already supports JTAG functionality, only four pins are required in the non-bondout package to fully support the 10-pin debug port 100 format of FIG. 3A.

More specifically, the test clock signal TCK, the test mode select signal TMS, the test data input signal TDI and the test data output signal TDO provided to and driven by the JTAG Test Access Port (TAP) controller 204 are conventional JTAG support signals and known to those skilled in the art. As discussed in more detail below, an enhanced embodiment of the debug port 100 adds the command acknowledge signal CMDACK, the break request/trace capture signal BRTC, the stop transmit signal STOPTX, and the trigger signal TRIG to the standard JTAG interface. The additional signals allow for pinpoint accuracy of external breakpoint assertion and monitoring, triggering of external devices in response to internal breakpoints, and elimination of status polling of the JTAG serial interface. Although these "sideband" signals offer extra functionality and improve communications speeds for the debug port 100, they are not required in the simplest embodiment of the invention (using only the conventional JTAG support signals). These signals are used, however, with an optional parallel port 214 provided on special bond-out versions of the embedded processor device 102.

Via the conventional JTAG signals, the JTAG TAP controller 204 accepts standard JTAG serial data and control. When a DEBUG instruction has been written to the JTAG instruction register, a serial debug shifter 212 is connected to the JTAG test data input signal TDI and test data output signal TDO, such that commands and data can then be loaded into and read from debug registers 210. In the disclosed embodiment of the invention, the debug registers 210 include two debug registers for transmitting (TX_DATA register) and receiving (RX_DATA register) data, an instruction trace configuration register (ITCR), and a debug control status register (DCSR).

A control interface state machine 206 coordinates the loading/reading of data to/from the serial debug shifter 212 and the debug registers 210. A command decode and processing block 208 decodes commands/data and dispatches them to processor interface logic 202 and trace debug interface logic 216. The processor interface logic 202 communicates directly with the processor core 104, as well as trace control logic 218. Parallel port logic 214 communicates with a control interface state machine 206 and the debug registers 210 to perform parallel data read/write operations in optional bond-out versions of the embedded processor device 102.

The trace control circuitry 218 provides trace information for reconstructing instruction execution flow on the processor core 104. The trace control circuitry 218 supports tracing either to a port 204 or 214 or to the internal trace cache 200 and provides user control for selectively turning trace on and off. Other features enabled by the trace control circuitry 218 include programmability of synchronization address generation and user specified trace records. The trace control 218 circuitry also controls the trace pad interface port 220. When utilized, the trace pad interface port 220 is capable of providing trace data while the processor core 104 is executing instructions, although clock synchronization and other difficulties may arise.

The trace cache 200 improves bandwidth matching and reduces the need to incorporate throttle-back circuitry in the processor core 104. In one contemplated embodiment of the invention, the trace cache 200 is a 128 entry first-in, first-out (FIFO) circular cache. Increasing the size of the trace cache 200 would lengthen the amount of software trace information that can be capture.

Before debug information is communicated via the debug port 100 using only conventional JTAG signals, the port 100 is enabled by writing the public JTAG instruction DEBUG into a JTAG instruction register contained within the TAP controller 204. As shown below, the JTAG instruction register of the disclosed embodiment is a 38-bit register comprising a 32-bit data field (debug_data[31:0]), a four-bit command field to point to various internal registers and functions provided by the debug port 100, a command pending flag, and a command finished flag. It is possible for some commands to use bits from the debug_data field as a sub-field field to extend the number of available commands.

| 37 | 5 | 2 | 1 | 0 |
|---|---|---|---|---|
| debug_data | command | P | F | |

JTAG Instruction Register

This JTAG instruction register is selected by toggling the test mode select signal TMS. The test mode select signal TMS allows the JTAG path of clocking to be changed in the scan path, enabling multiple paths of varying lengths to be used. Preferably, the JTAG instruction register is accessible via a short path. This register is configured to include a "soft" register for holding values to be loaded into or received from specified system registers.

Figure 4:
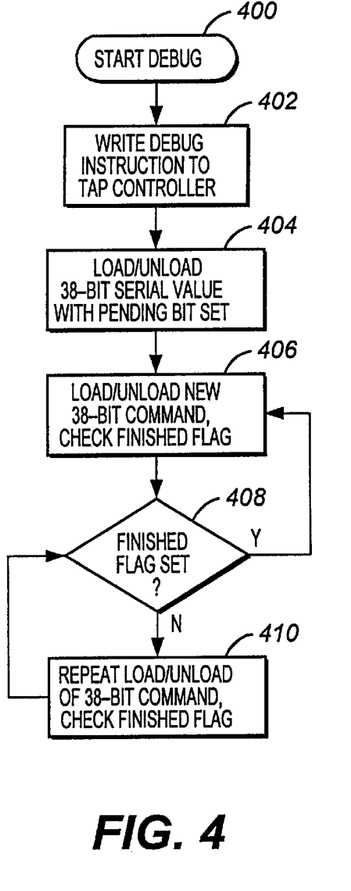
FIG. 4 is a flowchart illustrating software debug port command passing according to one embodiment of the invention.

FIG. 4 provides a high-level flow chart of command passing when using a standard JTAG interface. Upon entering debug mode in step 400 the DEBUG instruction is written to the TAP controller 204 in step 402. Next, step 404, the 38-bit serial value is shifted in as a whole, with the command pending flag set and desired data (if applicable, otherwise zero) in the data field. Control proceeds to step 406 where the pending command is loaded/unloaded and the command finished flag checked. Completion of a command typically involves transferring a value between a data register and a processor register or memory/IO location. After the command has been completed, the processor 104 clears the command pending flag and sets the command finished flag, at the same time storing a value in the data field if applicable. The entire 38-bit register is scanned to monitor the command finished and command pending flags. If the pending flag is reset to zero and the finished flag is set to one, the previous command has finished. The status of the flags is captured by the control interface state machine 206. A slave copy of the flags' status is saved internally to determine if the next instruction should be loaded. The slave copy is maintained due to the possibility of a change in flag status between TAP controller 204 states. This allows the processor 104 to determine if the previous instruction has finished before loading the next instruction.

If the finished flag is not set as determined in step 408, control proceeds to step 410 and the loading/unloading of the 38-bit command is repeated. The command finished flag is also checked. Control then returns to step 408. If the finished flag is set as determined in step 408, control returns to step 406 for processing of the next command. DEBUG mode is exited via a typical JTAG process.

Returning to FIG. 2, the aforementioned optional sideband signals are utilized in the enhanced debug port 100 to provide extra functionality. The optional sideband signals include a break request/trace capture signal BRTC that can function as a break request signal or a trace capture enable signal depending on the status of bit set in the debug control/status register. If the break request/trace capture signal BRTC is set to function as a break request signal, it is asserted to cause the processor 104 to enter debug mode (the processor 104 can also be stopped by scanning in a halt command via the convention JTAG signals). If set to function as a trace capture enable signal, asserting the break request/trace capture signal BRTC enables trace capture. Deasserting the signal turns trace capture off. The signal takes effect on the next instruction boundary after it is detected and is synchronized with the internal processor clock. The break request/trace capture signal BRTC may be asserted at any time.

The trigger signal TRIG is configured to pulse whenever an internal processor breakpoint has been asserted. The trigger signal TRIG may be used to trigger an external capturing device such as a logic analyzer, and is synchronized with the trace record capture clock signal TRACECLK. When a breakpoint is generated, the event is synchronized with the trace capture clock signal TRACECLK, after which the trigger signal TRIG is held active for the duration of trace capture.

The stop transmit signal STOPTX is asserted when the processor 104 has entered DEBUG mode and is ready for register interrogation/modification, memory or I/O reads and writes through the debug port 100. In the disclosed embodiment of the invention, the stop transmit signal STOPTX reflects the state of a bit in the debug control status register (DCSR). The stop transmit signal STOPTX is synchronous with the trace capture clock signal TRACECLK.

Figure 5:
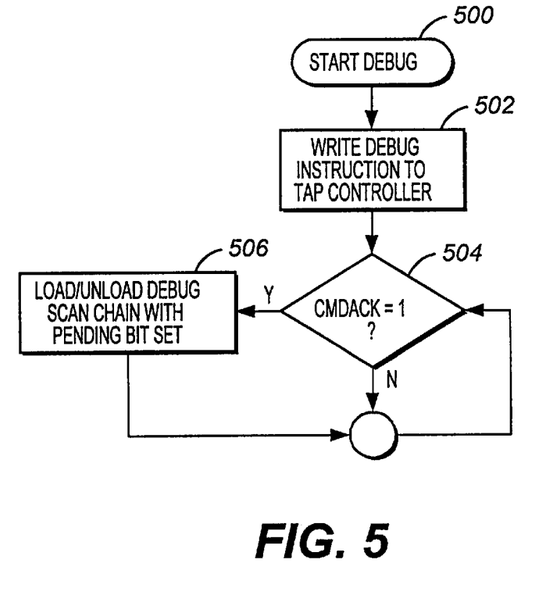
FIG. 5 is a flowchart illustrating enhanced software debug port command passing according to a second embodiment of the invention.

The command acknowledge signal CMDACK is described in conjunction with FIG. 5, which shows simplified command passing in the enhanced debug port 100 of FIG. 2. Again, to place the target system T into DEBUG mode, a DEBUG instruction is written to the TAP controller 204 in step 502. Control proceeds to step 504 and the command acknowledge signal CMDACK is monitored by the host system H to determine command completion status. This signal is asserted high by the target system T simultaneously with the command finished flag and remains high until the next shift cycle begins. When using the command acknowledge signal CMDACK, it is not necessary to shift out the JTAG instruction register to capture the command finished flag status. The command acknowledge signal CMDACK transitions high on the next rising edge of the test clock signal TCK after the command finished flag has changed from zero to one. When using the enhanced JTAG signals, a new shift sequence (step 506) is not started by the host system H until the command acknowledge signal CMDACK pin has been asserted high. The command acknowledge signal CMDACK is synchronous with the test clock signal TCK. The test clock signal TCK need not be clocked at all times, but is ideally clocked continuously when waiting for a command acknowledge signal CMDACK response.

OPERATING SYSTEM/APPLICATION COMMUNICATION VIA THE DEBUG PORT 100

Also included in debug register block 210 is an instruction trace configuration register (ITCR). This 32-bit register provides for the enabling/disabling and configuration of instruction trace debug functions. Numerous such functions are contemplated, including various levels of tracing, trace synchronization force counts, trace initialization, instruction tracing modes, clock divider ratio information, as well as additional functions shown in the following table. The ITCR is accessed through a JTAG instruction register write/read command as is the case with the other registers of the debug register block 210, or via a reserved instruction.

| BIT | SYMBOL | DESCRIPTION/FUNCTION |
| --- | --- | --- |
| 31:30 | Reserved | Reserved |
| 29 | RXINTEN | Enables interrupt when RX bit is set |
| 28 | TXINTEN | Enables interrupt when TX bit is set |
| 27 | TX | Indicates that the target system T is ready to transmit data to the host system H and the data is available in the TX_DATA register |
| 26 | RX | Indicates that data has been received from the host and placed in the RX_DATA register |
| 25 | DISL1TR | Disables level 1 tracing |
| 24 | DISL0TR | Disables level 0 tracing |
| 23 | DISCSB | Disables current segment base trace record |
| 22:16 | TSYNC[6:0] | Sets the maximum number of Branch Sequence trace records that may be output by the trace control block 218 before a synchronizing address record is forced |
| 15 | TSR3 | Sets or clears trace mode on DR3 trap |
| 14 | TSR2 | Sets or clears trace mode on DR2 trap |
| 13 | TSR1 | Sets or clears trace mode on DR1 trap |
| 12 | TSR0 | Sets or clears trace mode on DR0 trap |
| 11 | TRACE3 | Enables Trace mode toggling using DR3 |
| 10 | TRACE2 | Enables Trace mode toggling using DR2 |
| 9 | TRACE1 | Enables Trace mode toggling using DR1 |
| 8 | TRACE0 | Enables Trace mode toggling using DR0 |
| 7 | TRON | Trace on/off |
| 6:4 | TCLK[2:0] | Encoded divider ratio between internal processor clock and TRACECLK |
| 3 | ITM | Sets internal or external (bond-out) instruction tracing mode |
| 2 | TINIT | Trace initialization |
| 1 | TRIGEN | Enables pulsing of external trigger signal TRIG following receipt of any legacy debug breakpoint; independent of the Debug Trap Enable function in the DCSR |
| 0 | GTEN | Global enable for instruction tracing through the internal trace buffer or via the external (bond-out) interface |

Instruction Trace Configuration Register (ITCR)

Another debug register, the debug control/status register (DCSR), provides an indication of when the processor 104 has entered debug mode and allows the processor 104 to be forced into DEBUG mode through the enhanced JTAG interface. As shown in the following table, the DCSR also enables miscellaneous control features, such as: forcing a ready signal to the processor 104, controlling memory access space for accesses initiated through the debug port, disabling cache flush on entry to the DEBUG mode, the TX and RX bits, the parallel port 214 enable, forced breaks, forced global reset, and other functions. The ordering of bits in either the ITCR or DCSR is not considered critical to the invention.

| BIT | SYMBOL | DESCRIPTION/FUNCTION |
| --- | --- | --- |
| 31:12 | Reserved | Reserved |
| 11 | TX | Indicates that the target system T is ready to transmit data to the host system H and the data is available in the TX_DATA register |
| 10 | RX | Indicates that data has been received from the host and placed in the RX_DATA register |
| 9 | DISFLUSH | Disables cache flush on entry to DEBUG mode |
| 8 | SMMSP | Controls memory access space (normal memory space/system management mode memory) for accesses initiated through the Debug Port 100 |
| 7 | STOP | Indicates whether the processor 104 is in DEBUG mode (equivalent to stop transmit signal STOPTX |
| 6 | FRCRDY | Forces the ready signal RDY to the processor 104 to be pulsed for one processor clock; useful when it is apparent that the processor 104 is stalled waiting for a ready signal from a non-responding device |
| 5 | BRKMODE | Selects the function of the break request/ trace capture signal BRTC (break request or trace capture on/off) |
| 4 | DBTEN | Enables entry to debug mode or toggle trace mode enable on a trap/fault via processor 104 registers DR0–DR7 or other legacy debug trap/fault mechanisms |
| 3 | PARENB | Enables parallel port 214 |
| 2 | DSPC | Disables stopping of internal processor clocks in the Halt and Stop Grant states |
| 1 | FBRK | Forces processor 104 into DEBUG mode at the next instruction boundary (equivalent to pulsing the external BRTC pin) |
| 0 | FRESET | Forces global reset |

Debug Control/Status Register (DCSR)

When in cross debug environment such as that of FIG. 1, it is necessary for the parent task running on the target system T to send information to the host platform H controlling it. This data may consist, for example, of a character stream from a printf call or register information from a Task's Control Block (TCB). One contemplated method for transferring the data is for the operating system to place the data in a known region, then via a trap instruction, cause DEBUG mode to be entered.

Via debug port 100 commands, the host system H can then determine the reason that UG mode was entered, and respond by retrieving the data from the reserved region. However, while the processor 104 is in DEBUG mode, normal processor execution is stopped. As noted above, this is undesirable for many real-time systems.

This situation is addressed according to the present invention by providing two debug registers in the debug registers 210 for transmitting (TX_DATA register) and receiving (RX_DATA register) data. These registers can be accessed using the soft address and JTAG instruction register commands. As noted, after the host system H has written a debug instruction to the JTAG instruction register, the serial debug shifter 212 is coupled to the test data input signal TDI line and test data output signal TDO line.

When the processor 104 executes code causing it to transmit data, it first tests a TX bit in the ITCR. If the TX bit is set to zero then the processor 104 executes a processor instruction (either a memory or I/O write) to transfer the data to the TX_DATA register. The debug port 100 sets the TX bit in the DCSR and ITCR, indicating to the host system H that it is ready to transmit data. Also, the STOPTX pin is set high. After the host system H completes reading the transmit data from the TX_DATA register, the TX bit is set to zero. A TXINTEN bit in the ITCR is then set to generate a signal to interrupt the processor 104. The interrupt is generated only when the TX bit in the ITCR transitions to zero. When the TXINTEN bit is not set, the processor 104 polls the ITCR to determine the status of the TX bit to further transmit data.

When the host system H desires to send data, it first tests a RX bit in the ITCR. If the RX bit is set to zero, the host system H writes the data to the RX_DATA register and the RX bit is set to one in both the DCSR and ITCR. A RXINT bit is then set in the ITCR to generate a signal to interrupt the processor 104. This interrupt is only generated when the RX in the ITCR transitions to one. When the RXINTEN bit is not set, the processor 104 polls the ITCR to verify the status of the RX bit. If the RX bit is set to one, the processor instruction is executed to read data from the RX_DATA register. After the data is read by the processor 104 from the RX_DATA register the RX bit is set to zero. The host system H continuously reads the ITCR to determine the status of the RX bit to further send data.

This technique enables an operating system or application to communicate with the host system H without stopping processor 104 execution. Communication is conveniently achieved via the debug port 100 with minimal impact to on-chip application resources. In some cases it is necessary to disable system interrupts. This requires that the RX and TX bits be examined by the processor 104. In this situation, the communication link is driven in a polled mode.

PARALLEL INTERFACE TO DEBUG PORT 100

Some embedded systems require instruction trace to be examined while maintaining I/O and data processing operations. Without the use of a multi-tasking operating system, a bond-out version of the embedded processor device 102 is preferable to provide the trace data, as examining the trace cache 102 via the debug port 100 requires the processor 104 to be stopped.

In the disclosed embodiment of the invention, a parallel port 214 is also provided in an optional bond-out version of the embedded processor device 102 to provide parallel access to the debug port 100. This interface provides a 16-bit data path that is multiplexed with the trace pad interface port 220. More specifically, the parallel port 214 provides a 16-bit wide bi-directional data bus (PDATA[15:0]), a 2-bit address bus (PADR[2:0]), a read/write strobe signal (PRW), and a request—grant signal pair PBREQ-PBGNT (not shown). The parallel port 214 is enabled by setting a bit in the DCSR. Serial communications via the debug port 100 are not disabled when the parallel port 214 is enabled.

The parallel port 214 is primarily intended for fast downloads/uploads to and from target system T memory. However, the parallel port 214 may be used for all debug communications with the target system T whenever the processor 104 is stopped. The serial debug signals (standard or enhanced) are used for debug access to the target system T when the processor 104 is executing instructions.

In a similar manner to the JTAG standard, all inputs to the parallel port 214 are sampled on the rising edge of the test clock signal TCK, and all outputs are changed on the falling edge of the test clock signal TCK. In the disclosed embodiment, the parallel port 214 shares pins with the trace pad interface 220, requiring parallel commands to be initiated only while the processor 104 is stopped and the trace pad interface 220 is disconnected from the shared bus.

The parallel bus request signal PBREQ and parallel bus grant signal PBGNT are provided to expedite multiplexing of the shared bus signals between the trace cache 200 and the parallel port 214. When the host interface to the parallel port 214 determines that the parallel bus request signal PBREQ is asserted, it begins driving the parallel port 214 signals and asserts the parallel bus grant signal PBGNT.

When entering or leaving DEBUG mode with the parallel port 214 enabled, the parallel port 214 is used for the processor state save and restore cycles. The parallel bus request signal PBREQ is asserted immediately before the beginning of a save state sequence penultimate to entry of DEBUG mode. On the last restore state cycle, the parallel bus request signal PBREQ is deasserted after latching the write data. The parallel port 214 host interface responds to parallel bus request signal PBREQ deassertion by tri-stating its parallel port drivers and deasserting the parallel bus grant signal PBGNT. The parallel port 214 then enables the debug trace port pin drivers, completes the last restore state cycle, asserts the command acknowledge signal CMDACK, and returns control of the interface to trace control logic 218.

When communicating via the parallel port 214, the address pins PADR[2:0] are used for selection of the field of the JTAG instruction register, which is mapped to the 16-bit data bus PDATA[15:0]. It is not necessary to update both halves of the debug data [31:0] register if only one of the halves is being used (e.g., on 8-bit I/O cycle data writes). The command pending flag is automatically set when performing a write operation to the four-bit command register, and is cleared when the command finished flag is asserted. The host system H can monitor the command acknowledge signal CMDACK to determine when the finished flag has been asserted. Use of the parallel port 214 provides full visibility of execution history, even when the trace cache 200 is turned on, without requiring throttling of the processor core 104.

OPERATING SYSTEM AND DEBUGGER INTEGRATION

The operation of all debug supporting features, including the trace cache 200, can be controlled through the debug port 100 or via processor instructions. These processor instructions may be from a monitor program, target hosted debugger, or conventional pod-wear. The debug port 100 performs data moves which are initiated by serial data port commands rather than processor instructions.

Operation of the processor from conventional pod-space is very similar to operating in DEBUG mode from a monitor program. All debug operations can be controlled via processor instructions. It makes no difference whether these instructions come from pod-space or regular memory. This enables an operating system to be extended to include additional debug capabilities.

Of course, via privileged system calls such a ptrace, operating systems have long supported debuggers. However, the incorporation of an on-chip trace cache 200 now enables an operating system to offer a trace capability. The ability to trace is often considered essential in real-time applications.

In a debug environment according to the present invention, an operating system could support limited trace without the incorporation of an "external" logic analyzer or in-circuit emulator.

Extending an operating system to support on-chip trace has certain advantages within the communications industry. It enables the system I/O and communication activity to be maintained while a task is being traced. Traditionally, the use of an in-circuit emulator has necessitated that the processor be stopped before the processor's state and trace can be examined [unlike ptrace()]. This disrupts continuous support of 1/0 data processing. The trace cache 200 is very useful when used with equipment in the field. If an unexpected system crash occurs, the trace cache 200 can be examined to observe the execution history leading up to the crash event. When used in portable systems or other environments in which power consumption is a concern, the trace cache 200 can be disabled as necessary via power management circuitry.

TRACE RECORD FORMAT

In the disclosed embodiment of the invention, an instruction trace record (ITREC) is 20 bits wide and consists of two fields, TCODE and TDATA. The TCODE field is a code that identifies the type of data in the TDATA field. The TDATA field contains software trace information used for debug purposes.

Instruction Trace Record Format

In one contemplated embodiment of the invention, the embedded processor device 102 reports eleven different trace codes as set forth in the following table:

| TCODE# | TCODE Type | TDATA |
|---|---|---|
| 0000 | Missed Trace | Not valid |
| 0001 | Conditional Branch | Contains Branch Sequence |
| 0010 | Branch Target | Contains Branch Target Address |
| 0011 | Previous Segment Base | Contains Previous Segment Base Address and Attributes |
| 0100 | Current Segment Base | Contains Current Segment Base Address and Attributes |
| 0101 | Interrupt | Contains Vector Number of Exception or Interrupt |
| 0110 | Trace Synchronization | Contains Address or Currently Executed Instruction |
| 0111 | Multiple Trace | Contains 2nd or 3rd Record of Entry With Multiple Records |
| 1000 | Trace Stop | Contains Instruction Address Where Trace Capture Was Stopped |
| 1001 | User Trace | Contains User Specified Trace Data |
| 1010 | Performance Profile | Contains Performance Profiling Data |

The trace cache 200 is of limited storage capacity; thus a certain amount of "compression" in captured trace data is desirable. In capturing trace data, the following discussion assumes that an image of the program being traced is available to the host system H. If an address can be obtained from a program image (Object Module), then it is not provided in the trace data. Preferably, only instructions which disrupt the instruction flow are reported; and further, only those where the target address is in some way data dependant. For example, such "disrupting" events include call instructions or unconditional branch instructions in which the target address is provided from a data register or other memory location such as a stack.

As indicated in the preceding table, other desired trace information includes: the target address of a trap or interrupt handler; the target address of a return instruction; a conditional branch instruction having a target address which is data register dependent (otherwise, all that is needed is a 1-bit trace indicating if the branch was taken or not); and, most frequently, addresses from procedure returns. Other information, such as task identifiers and trace capture stop/start information, can also be placed in the trace cache 200. The precise contents and nature of the trace records are not considered critical to the invention.

Figure 3A:
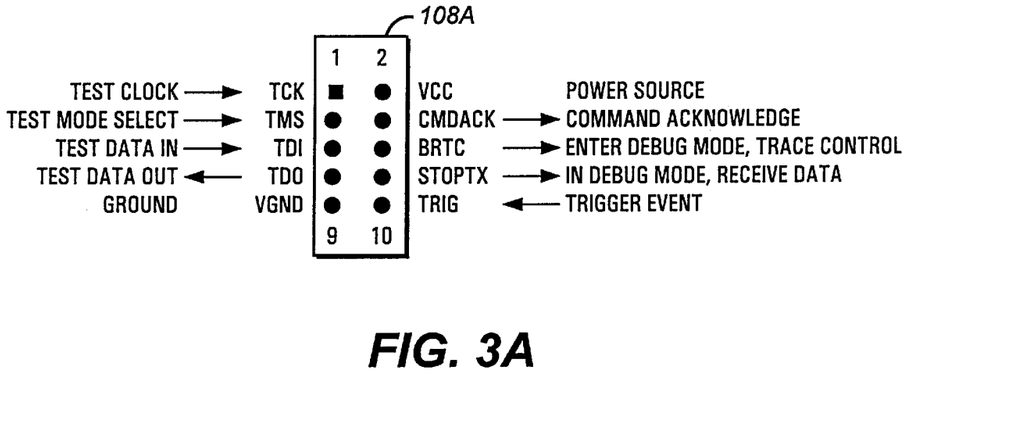
FIGS. 3A and 3B depict exemplary software debug port connectors for use in a debug environment in accordance with the invention.
Figure 3B:
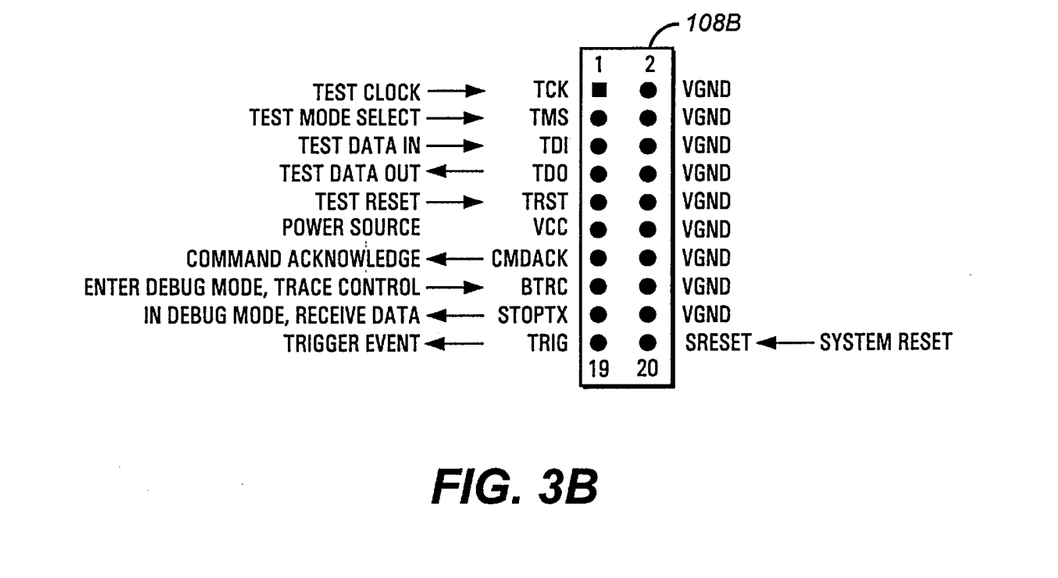

FIGS. 3A and 3B depict exemplary serial debug port connectors 108A and 108B, respectively, for use in a debug environment according to the invention. Referring first to FIG. 3A, the communication signals of the enhanced version of the debug port 100 are provided as shown to a 10-pin serial connector 108A. A power supply signal Vcc and a ground signal Vgnd are also coupled to the serial connector 108A. By providing the serial connector 108A in production systems, a host system H can be readily coupled, thereby facilitating in-field debugging operations.

Referring now to FIG. 3B, a 20-pin serial connector 108B is shown. This version of the serial connector 108 is preferred in situations in which the serial connector is clocked at high speeds (e.g., above 10 MHz) where there is a danger of signal cross-talk. Although the signals of the connector 108A of FIG. 3A are identical to those of FIG. 3B, the 20-pin arrangement places a ground wire between each signal wire to reduce signal cross-talk. It should be noted that voltage level conversion may be required in the serial connector 108A or 108B to ensure correct voltage levels for connecting a host system H or other interface. The precise ordering of the debug port 100 signals provided by the serial connectors 108A and 108B is not considered critical to the invention.

Thus, a processor-based device providing a flexible, high-performance solution for embedded hardware/software debug has been described. The processor-based device incorporates a software debug port that utilizes a JTAG or similar standardized interface, providing a serial debug communication mechanism that does not require a special bond-out package. When used in conjunction with an on-chip trace cache, the software debug port is capable of providing trace information for reconstructing instruction execution flow on the processor and is also capable of examining register contents without halting processor operation. The software debug port alleviates many packaging and clock synchronization problems.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A processor-based device provided with pins to permit connection to external electrical devices, the processor-based device comprising:

a processor core;

a serial port formed of a plurality of pins configured to receive standardized serial port signals as well as signals from external non-trace capture software deDug equipment;

control circuitry coupled to the serial port for decoding and differentiating between standardized serial port signals and signals used by the external non-trace capture software debug equipment;

a plurality of debug registers coupled to the control circuitry and the processor core for receiving and providing debug data and control signals; and at least one additional pin of the serial port configured to facilitate communication between the external non-trace capture software debug equipment and the processor core, wherein the processor core is adapted to perform various software debug operations in response to signals from the external non-trace capture software debug equipment, the at least one additional pin providing an indication of the status of select software debug operations.

2. The processor-based device of claim 1, wherein the serial port is essentially compliant with the IEEE-1149.1-1990 JTAG interface standard or other similar standard.

3. The processor-based device of claim 1, wherein the serial port utilizes the conventional JTAG signals TMS, TCK, TDI and TDO.

4. The processor-based device of claim 1, wherein the status of the at least one additional pin is capable of being examined by external software debug equipment without halting normal processor operation.

5. The processor-based device of claim 1, further comprising an on-chip trace cache coupled to the processor core and serial port, the trace cache adapted to store information indicative of the order in which instructions are executed by the processor core.

6. The processor-based device of claim 5, wherein the contents of the trace cache can be examined by external software debug equipment via the serial port.

7. The processor-based device of claim 1, wherein the indication of the status of select software debug operations comprises assertion of a signal at the at least one additional pin following completion of a debug operation.

8. The processor-based device of claim 1, wherein the indication of the status of select software debug operations comprises assertion of a signal at the at least one additional pin following receipt of a debug data or control signal.

9. A software debug platform for communicating with a non-trace capture host system capable of executing debug software that controls the extraction and analysis of debug information, the software debug platform comprising:

a target system having a processor-based device, the processor-based device comprising:

a processor core;

a serial port formed of a plurality of pins configured to receive standardized serial port signals as well as signals from the non-trace capture host system;

control circuitry coupled to the serial port for decoding and differentiating between standardized serial port signals and signals used by the non-trace capture host system;

a plurality of debug registers coupled to the control circuitry and the processor core for receiving and providing debug data and control signals; and at least one additional pin of the serial port configured to facilitate communication between non-trace capture host system and the processor core, wherein the processor core is adapted to perform various software debug operations in response to signals from the non-trace capture host system, the at least one additional pin providing an indication of the status of select software debug operations; and a debug connector for communicatively coupling the serial port and the at least one additional pin of the target system with the non-trace capture host system.

10. The software debug platform of claim 9, wherein the serial port is essentially compliant with the IEEE-1149.1-1990 JTAG interface standard or other similar standard.

11. The processor-based device of claim 10, wherein the serial port utilizes the conventional JTAG signals TMS, TCK, TDI and TDO.

12. The software debug platform of claim 9, wherein the status of the at least one additional pin is capable of being examined by the host system without halting normal processor core operation.

13. The software debug platform of claim 9, further comprising an on-chip trace cache coupled to the processor core and serial port, the trace cache adapted to store information indicative of the order in which instructions are executed by the processor core.

14. The software debug platform of claim 13, wherein the contents of the trace cache can be examined by the host system via the serial port.

15. The software debug platform of claim 9, wherein the debug connector is a serial-to-parallel interface.

16. The software debug platform of claim 9, wherein the debug connector is a serial-to-network interface.

17. The software debug platform of claim 9, wherein the indication of the status of select software debug operations comprises assertion of a signal at the at least one additional pin following completion of a debug operation.

18. The software debug platform of claim 9, wherein the indication of the status of select software debug operations comprises assertion of a signal at the at least one additional pin following receipt of a debug data or control signal.

19. A processor-based device provided with pins to permit connection to external electrical devices, the processor-based device comprising:

a processor core;

a serial port formed of a plurality of pins configured to receive standardized serial port signals as well as signals from external non-trace capture software debug equipment;

at least one additional pin configured to facilitate communication between external non-trace capture software debug equipment and the processor core;

control means coupled to the serial port for decoding and differentiating between standardized serial port signals and signals used by external non-trace capture software debug equipment; and communication means coupled to the control means and the processor core for receiving and providing debug data and control signals, wherein the processor core is adapted to perform various software debug operations in response to signals from external non-trace capture software debug equipment, the at least one additional pin providing an indication of the status of software debug operations.

20. The processor-based device of claim 19, further comprising trace storage means coupled to the processor core and serial port, the trace storage means adapted to store information indicative of the order in which instructions are executed by the processor core.

21. The processor-based device of claim 20, wherein the contents of the trace storage means can be examined by external software debug equipment via the serial port.

22. The processor-based device of claim 19, wherein the indication of the status of select software debug operations comprises assertion of a signal at the at least one additional pin following completion of a debug operation.

23. The processor-based device of claim 19, wherein the indication of the status of select software debug operations comprises assertion of a signal at the at least one additional pin following receipt of a debug data or control signal.

24. A method of providing software debug information from a processor-based device to external non-trace capture debug equipment, comprising:

providing a serial port in the processor-based device, the serial debug port formed of a plurality of pins configured to receive standardized serial port signals in addition to signals from external non-trace capture debug equipment, the serial port further being coupled to control circuitry for decoding and differentiating between standardized serial port signals and signals used by the external debug equipment;

providing at least one additional pin in the processor-based device, the at least one additional pin configured to facilitate communication between external non-trace capture debug equipment and the processor-based device;

selectively performing software debug operations in the processor-based device in response to signals from the external non-trace capture debug equipment communicated via the serial port; and communicating the status of the debug operations from the processor-based device to the external non-trace capture debug equipment via the at least one additional pin.

25. The method of claim 24, further comprising the step of communicating the results of the software debug operations from the processor-based device to the external debug equipment via the serial port.

26. The method of claim 24, wherein the serial port is essentially compliant with the IEEE-1149.1-1990 JTAG interface standard or other similar standard.

27. The method of claim 24, further comprising the steps of:

providing a trace cache in the processor-based device, the trace cache adapted to store information indicative of the order in which instructions are executed by the processor-based device; and communicating the contents of the trace cache from the processor-based device to the external debug equipment via the serial port.

28. The method of claim 24, wherein the step of communicating the status of the debug operations comprises assertion of a signal following completion of a debug operation.

29. The method of claim 24, wherein the step of communicating the status of the debug operations comprises assertion of a signal following receipt of a debug data or control signal.

* * * * *